United States Patent
Hasegawa

(10) Patent No.: US 6,385,830 B2
(45) Date of Patent: May 14, 2002

(54) ELECTRIC WIRE SUPPLYING APPARATUS

(75) Inventor: Hiroshi Hasegawa, Shizuoka-ken (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/781,405

(22) Filed: Feb. 13, 2001

(30) Foreign Application Priority Data

Feb. 14, 2000 (JP) ......................................... 2000-035931

(51) Int. Cl.$^7$ ......................... H01R 43/04; B65H 20/00; B65H 31/30
(52) U.S. Cl. ..................... 29/33 M; 29/564.4; 29/753; 221/294; 226/137
(58) Field of Search ............................. 29/564.4, 564.6, 29/33 M, 753, 758; 226/137; 221/294

(56) References Cited

U.S. PATENT DOCUMENTS 6,154,949 A * 12/2000 Hasegawa .................. 29/564.4
6,279,215 B1 * 8/2001 Nomoto ..................... 29/33 M

FOREIGN PATENT DOCUMENTS

JP        2000-123947        4/2000

* cited by examiner

*Primary Examiner*—William Briggs
(74) *Attorney, Agent, or Firm*—Finnegan, Henderson, Farabow, Garrett, & Dunner, L.L.P.

(57) ABSTRACT

An electric wire supplying apparatus comprises an electric wire transfer tube 27 provided at its tip end with a notch 28a, a nozzle 32 disposed on the tip end of the electric wire transfer tube 27, a transfer tube fixing holder 23 fixing the tip end of the electric wire transfer tube 27 and having an opening 24b opened in the notch 28a of the electric wire transfer tube 27, and an electric wire pressing means 29 having an electric wire pressing portion 31 that moves into and out from the notch 28a and moving the electric wire pressing portion 31 between a pressing position for pressing an electric wire and a standby position for not pressing the electric wire, wherein the nozzle 32 is provided at its portion closer to the electric wire transfer tube 27 with a projecting portion 35 for substantially complementing a shape of the notch 28a when the projecting portion 35 is butted to a tip end of the electric wire transfer tube 27, and the nozzle 32 can move between a close position where the projecting portion 35 is brought into close contact with the notch 28a of the electric wire transfer tube 27 and butted to the notch 28a to close the opening 24b, and an open position where the projecting portion 35 is separated from the notch 28a of the electric wire transfer tube 27 to open the opening 24b.

4 Claims, 8 Drawing Sheets

ELECTRIC WIRE SUPPLYING APPARATUS

BACKGROUND OF THE INVENTION

1. Field of the Invention

The present invention relates to an electric wire supplying apparatus for supplying an electric wire from a nozzle to a working machine at the time of working of electric wire.

2. Description of the Related Art

For example, there is an electric wire working apparatus for conducting a peeling step for peeling a coating skin of a contact of a tip end of a long electric wire (electric cable) used for a wire harness (electric wire for automobile), a contact crimping step for connecting the peeled contact to another contact by crimping, a cutting step for cutting the electric wire into a predetermined length, a peeling step for peeling the coating skin of the other contact of the cut electric wire, and a contact crimping step for connecting the peeled other contact to another contact by crimping. In such an electric wire working apparatus, an electric wire supplying apparatus for supplying a tip end of the long electric wire by a predetermined length to a working machine that conducts the peeling step whenever each working is completed.

The present assignee previously proposed an electric wire supplying apparatus (see Japanese Patent Application No. H10-297291) (not prior art) as shown in FIGS. 1 and 2. In FIGS. 1 and 2, a driving cylinder 3 is fixed to a tip end of a turning arm 1 through a connecting plate 2, and a fixing holder 4 is fixed to the driving cylinder 3. The fixing holder 4 comprises a holder body 5 having a recess 5a, and a lid 7 fixed to an upper portion of the holder body 5 through bolts 6 for covering an upper portion of the recess 5a. A tip end 9 of an electric wire transfer tube 8 and a base end 11 of a nozzle 10 are disposed in the recess 5a. The tip end 9 of the electric wire transfer tube 8 and the base end 11 of the nozzle 10 are pressed by the lid 7 and fixed.

As shown in FIG. 2, an electric wire W is transferred toward the nozzle 10 through an electric wire insertion passage 8a in the electric wire transfer tube 8, and the transferred electric wire is led out from a tip end opening 10b of the nozzle 10 through an electric wire passage 10a in the nozzle 10. The tip end 9 of the electric wire transfer tube 8 is provided with a notch 9a that is opened downward, and the holder body 5 is provided at its portion corresponding to the notch 9a with an opening 5b. An electric wire pressing portion 13 fixed to a piston rod 12 of the driving cylinder 3 is disposed in the opening 5b. The electric wire pressing portion 13 is driven by the driving cylinder 3 and moved into and out from the notch 9a, and the electric wire pressing portion 13 can move between a pressing position where the electric wire pressing portion 13 presses the electric wire W of the electric wire insertion passage 8a and a standby position where the electric wire W of the electric wire insertion passage 8a is allowed to be transferred.

In the above structure, if the electric wire W inserted into the electric wire insertion passage 8a of the electric wire transfer tube 8 is moved in an electric wire sending-out direction, a tip end of the electric wire W is guided by the electric wire insertion passage 8a and transferred toward the nozzle 10. When the tip end of the electric wire W comes out from the electric wire transfer tube 8, the tip end enters into the electric wire passage 10a of the nozzle 10, and the tip end in the electric wire transfer tube 8 is guided therein and led out from the tip end opening 10b. When the tip end is led out from the tip end opening 10b by a predetermined length, the sending-out operation is stopped, thereby bringing the electric wire W into a state in which the electric wire W is to be pulled out by a predetermined length by the nozzle 10. Various working machines are disposed at predetermined rotation positions where the turning arm 1 is turned and at positions in the vicinity of and opposed to the nozzle 10, and the tip end of the electric wire W led out from the tip end of the nozzle 10 is worked by the various working machines. When the tip end is worked, the electric wire pressing portion 13 is moved to the pressing position to clamp the electric wire W, and when a predetermined working is completed, the tip end of the electric wire W is cut into a predetermined length. This cut tip end portion of the electric wire W is sent to a subsequent step, the electric wire pressing portion 13 is moved to the standby position to release the clamping motion, the tip end of the electric wire W of the electric wire transfer tube 8 is sent through a predetermined length, the electric wire W is pulled out through a predetermined length from the nozzle 10, and the above operations are repeated. That is, the electric wire supplying apparatus supplies a tip end of the long electric wire W from the tip end of the nozzle 10 sequentially whenever a predetermined working of the tip end of the electric wire W is completed.

When various electric wires are replaced due to color change of the electric wire W or when electric wire W run out and is re-supplied, it is necessary to send a new electric wire W from the base end of the electric wire transfer tube 8 to the nozzle 10.

However, in the conventional electric wire supplying apparatus, since the tip end portion of the electric wire transfer tube 8 is provided with the notch 9a and the opening 5b opened therein, if the tip end portion of the electric wire W is bent or suspended down, the tip end abuts against an inner surface of the opening 5b of the fixing holder 4 as shown in FIG. 2, and there is an adverse possibility that the electric wire W can not reliably be sent toward the nozzle 10.

SUMMARY OF THE INVENTION

The present invention has been accomplished to solve the above problems, and it is an object of the invention to provide an electric wire supplying apparatus capable of reliably sending a new electric wire from an electric wire transfer tube toward a nozzle.

According to a first aspect of the invention, there is provided an electric wire supplying apparatus comprising a electric wire transfer tube for guiding an electric wire inserted into an electric wire insertion passage in the electric wire transfer tube into an electric wire sending-out direction and provided at its tip end with a notch, a nozzle disposed on a tip end of the electric wire transfer tube for guiding the electric wire sent out from the electric wire insertion passage out from a tip end opening through an electric wire passage in the nozzle transfer tube fixing holder for fixing a tip end of the electric wire transfer tube and having an opening opened in the notch of the electric wire transfer tube and electric wire pressing means having an electric wire pressing portion that can move from the opening into and out from the notch and moving the electric wire pressing portion between a pressing position for pressing the electric wire of the electric wire insertion passage and a standby position for sending the wee of the electric wire insertion passage, wherein the nozzle is provided at its portion closer to the electric wire transfer tube with a projecting portion for substantially complementing a shape of the notch when the projecting portion is butted to a tip end of the electric wire transfer tube and the nozzle can move between a close position where the projecting portion is brought into close contact with the notch of the electric wire transfer tube and butted to the notch to close the opening, and an open position where the projecting portion is separated from the notch of the electric wire transfer tube to open the opening.

According to this electric wire supplying apparatus, when a new electric wire is allowed to pass to the nozzle for changing quality, size or color of the electric wire, the nozzle is brought into the close position, and the electric wire inserted into the electric wire transfer tube is transferred into the electric wire sending-out direction. If the tip end of the electric wire reached the notch of the electric wire transfer tube, since the notch butts to the projecting portion of the nozzle and the opening of the transfer tube fixing holder is closed, the electric wire is guided to the electric wire passage of the nozzle even if a tip end of the electric wire is bent or suspended downward. After the inserting operation of the new electric wire is completed, the nozzle is moved to the open position so that the electric wire pressing portion can retreat into the notch a, and the electric wire pressing portion can freely clamp the electric wire and release the clamp.

According to a second aspect of the invention, in the electric wire supplying apparatus of the first aspect, the nozzle is moved between the close position and the open position by a driving force of nozzle driving means.

With this electric wire supplying apparatus, in addition to the effect of the first aspect, since the nozzle is moved between the close position and the open position by a driving force of nozzle driving means, the nozzle can automatically be moved, and the electric wire can be automatically sent.

According to a third aspect of the invention, in the electric wire supplying apparatus of the first aspect, the nozzle is supported by a connection rod that is moved while being guided by the transfer tube fixing holder and by a nozzle support holder fixed to the connection rod.

With this electric wire supplying apparatus, in addition to the effect of the first aspect, since the nozzle is supported by the transfer tube fixing holder through the connection rods and the nozzle support holder in such a manner that the nozzle is movable. Therefore, it is possible to stably position the nozzle with respect to the electric wire transfer tube and to stably move the nozzle.

According to a fourth aspect of the invention, in the electric wire supplying apparatus of the first aspect, the projecting portion has a shape which completely complements and coincides with the shape of the notch when the projecting portion is butted to the tip end of the electric wire transfer tube.

With this electric wire supplying apparatus, in addition to the effect of the first aspect, a tip end of a new electric wire can smoothly pass through a connected portion between the electric wire transfer tube and the nozzle.

BRIEF DESCRIPTION OF THE DRAWINGS

There will be detailed below one embodiment of the present invention with reference to the accompanying drawings.

FIGS. 8A and 8B show the embodiment of the invention, wherein FIG. 8A is an enlarged sectional view of an essential portion of the electric wire supplying apparatus for explaining the operation for guiding a new electric wire toward the nozzle, and FIG. 8B is an enlarged sectional view of the essential portion of the electric wire supplying apparatus for showing a state in which the guiding operation of the new electric wire toward the nozzle is completed.

DESCRIPTION OF THE PREFERRED EMBODIMENT

Figure 1:
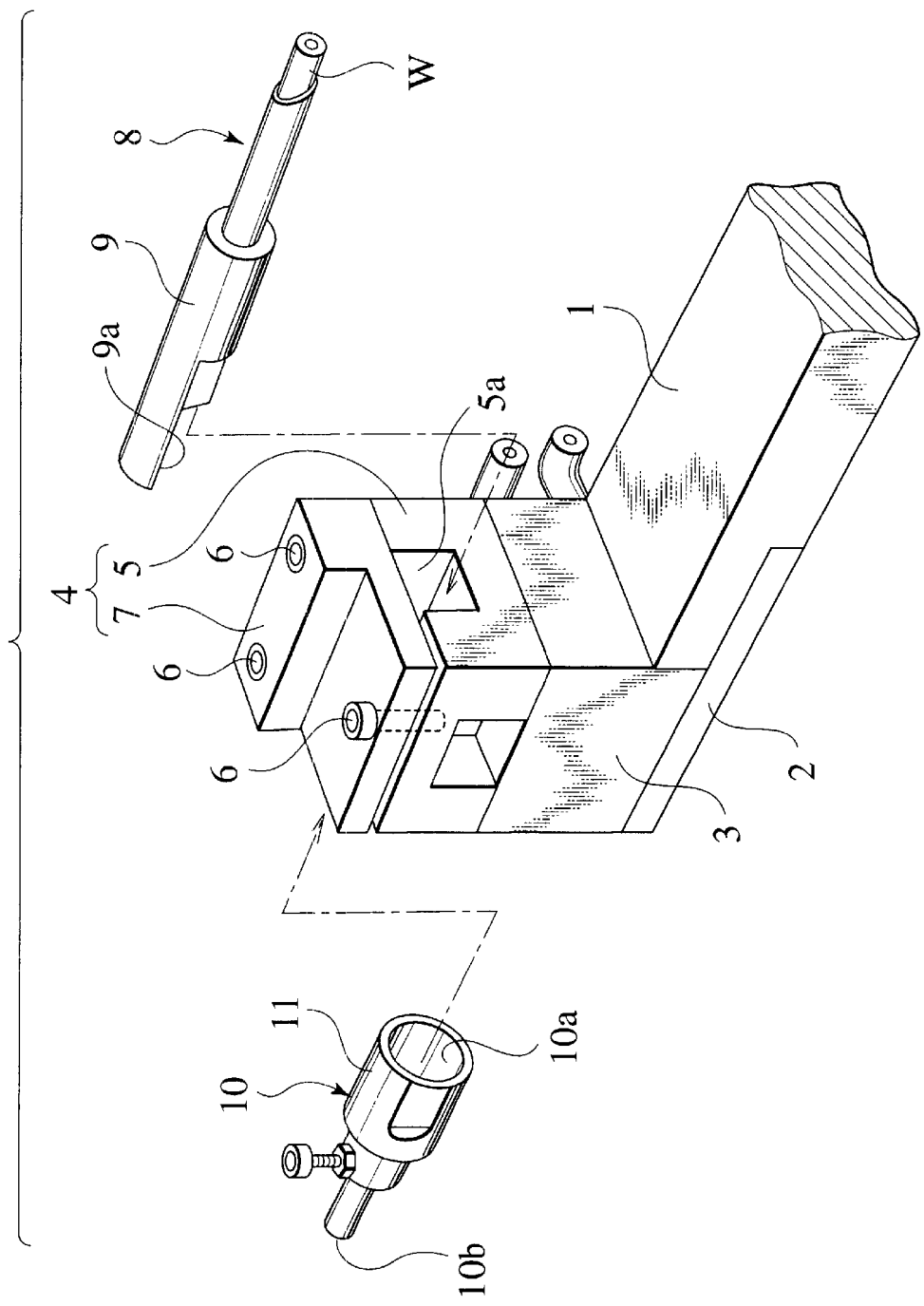
FIG. 1 is a perspective view of an essential portion of a conventional electric wire supplying apparatus.
Figure 2:
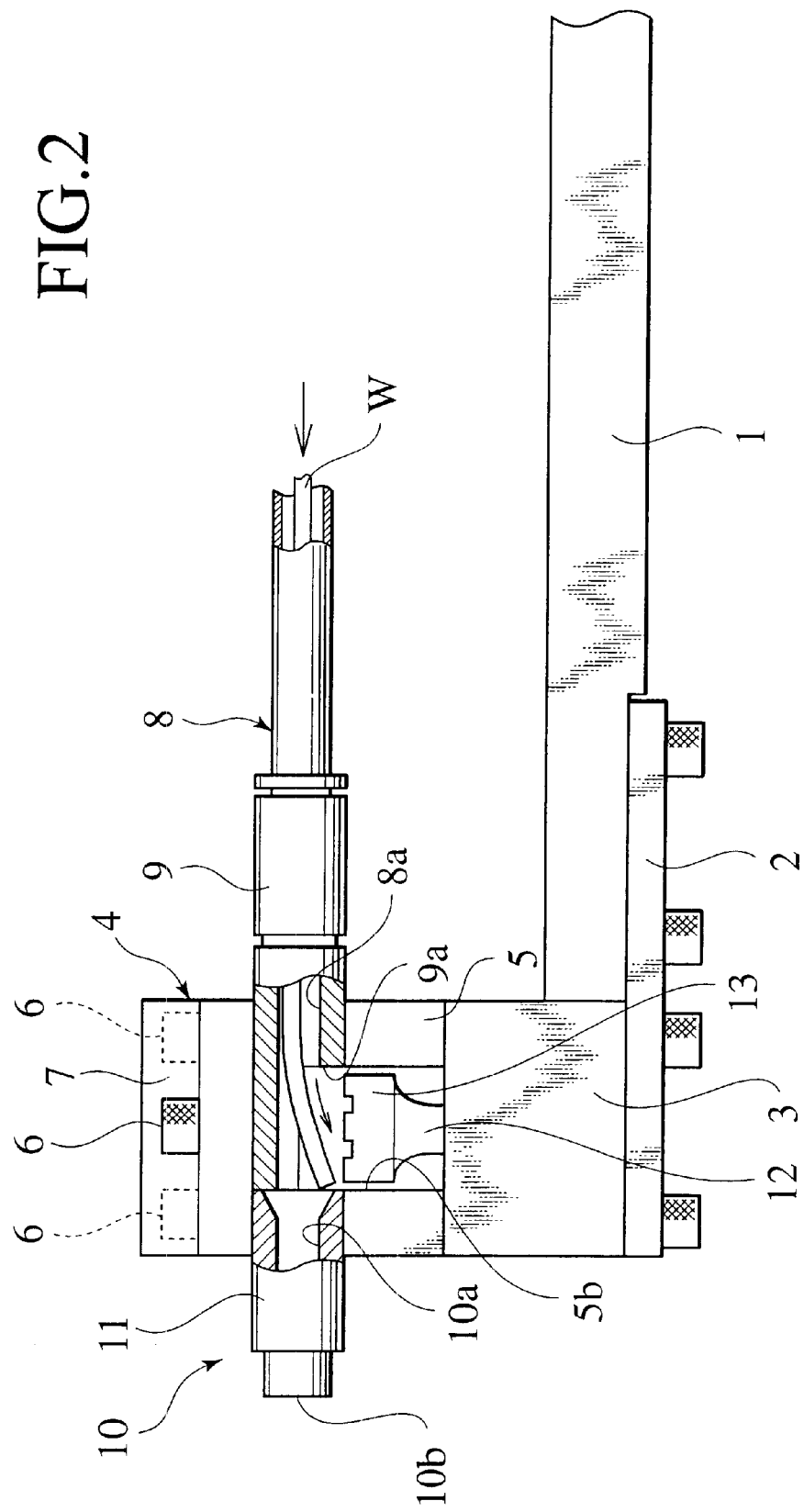
FIG. 2 is a sectional view of the essential portion of the conventional electric wire supplying apparatus.
Figure 3:
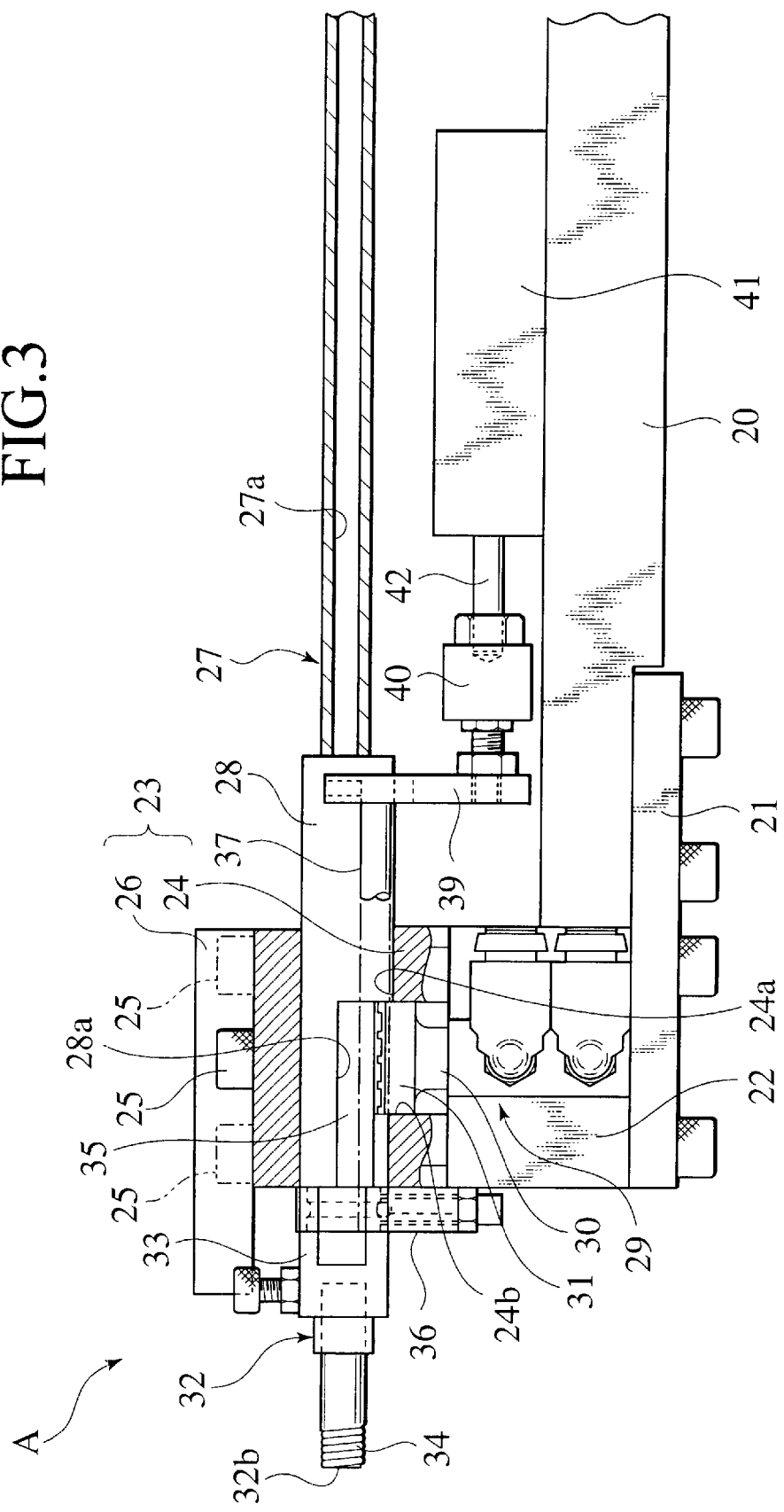
FIG. 3 is a partially cut-away side view of an essential portion of an electric wire supplying apparatus of an embodiment of the present invention.
Figure 4:
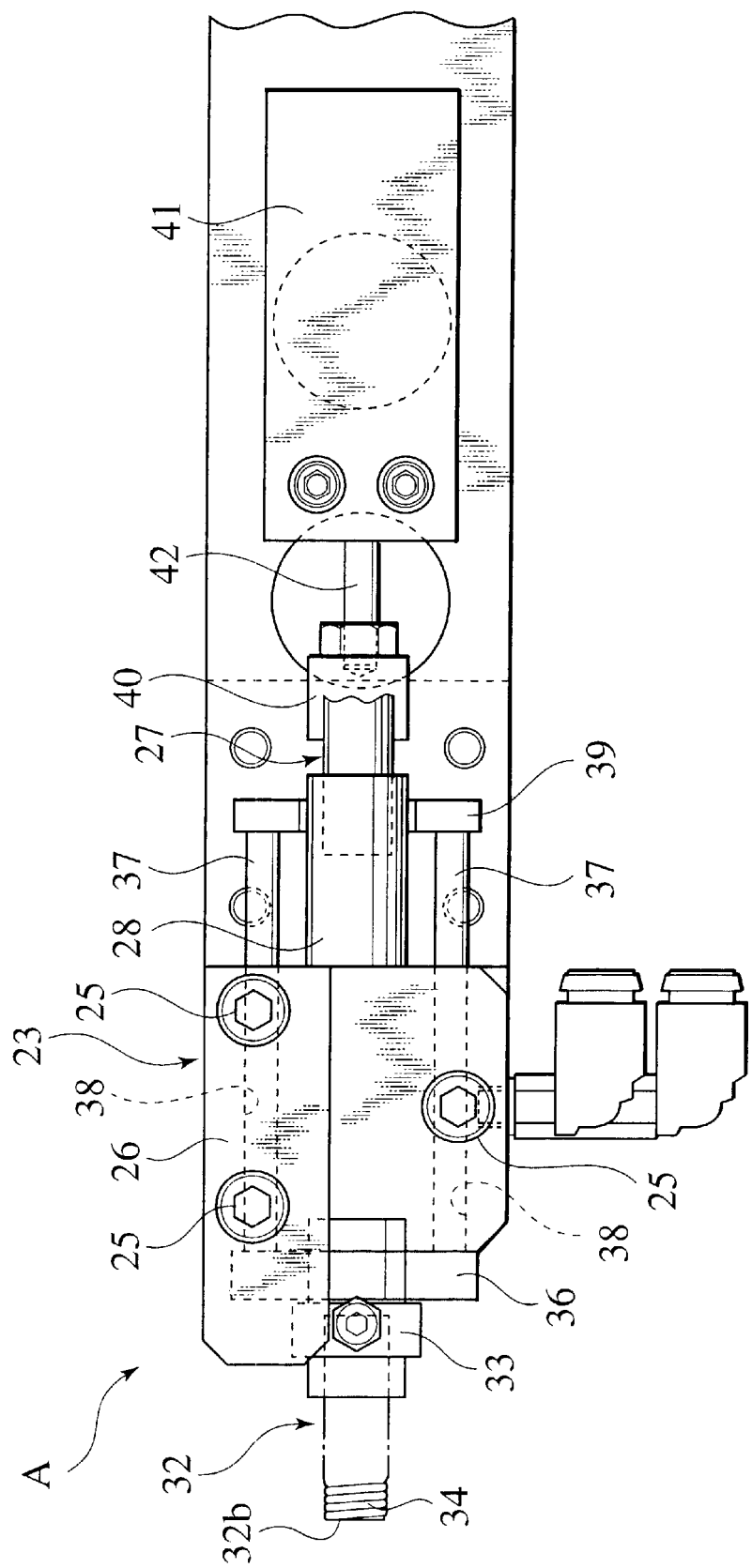
FIG. 4 is a plan view of the essential portion of the electric wire supplying apparatus of the embodiment of the invention.
Figure 5:
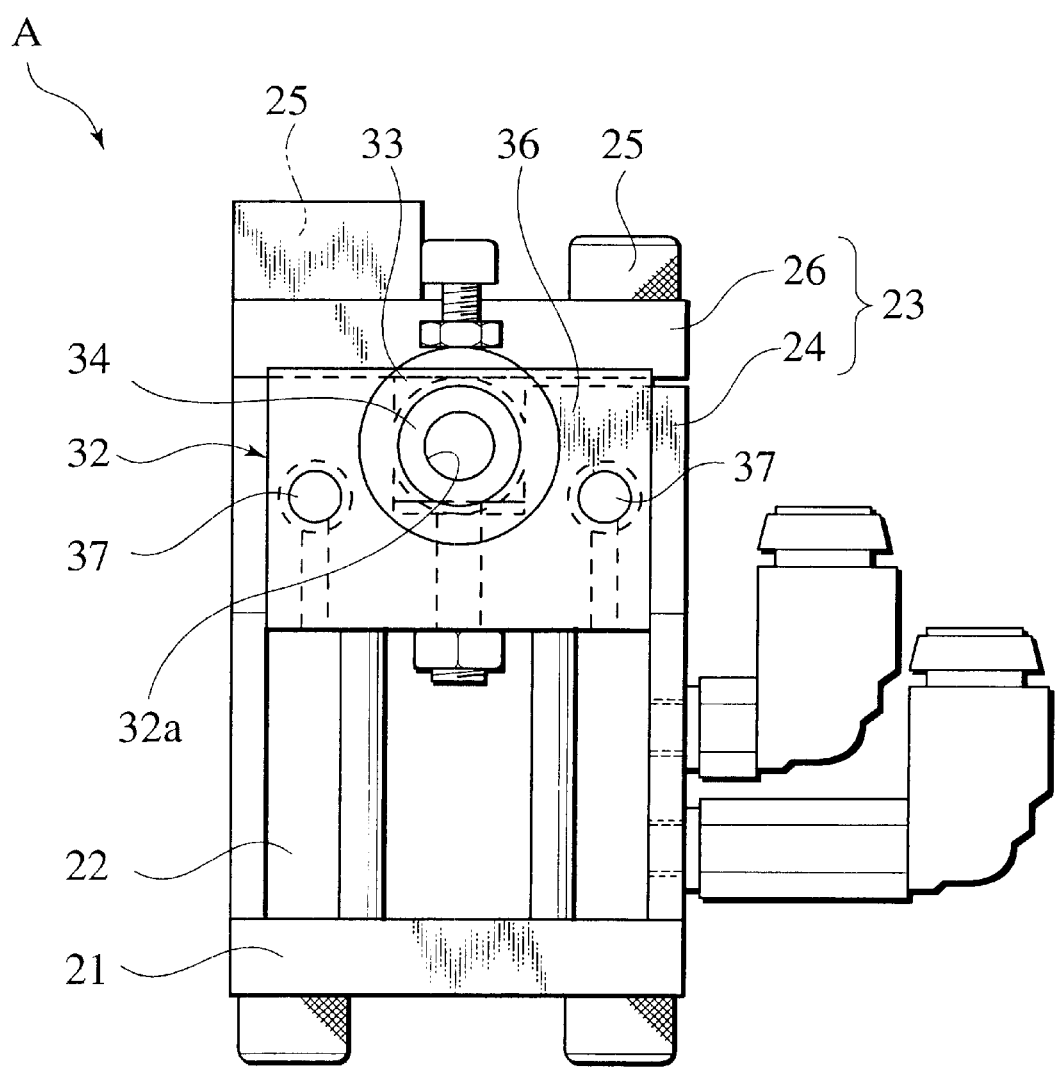
FIG. 5 is a front view of the electric wire supplying apparatus of the embodiment of the invention.
Figure 6:
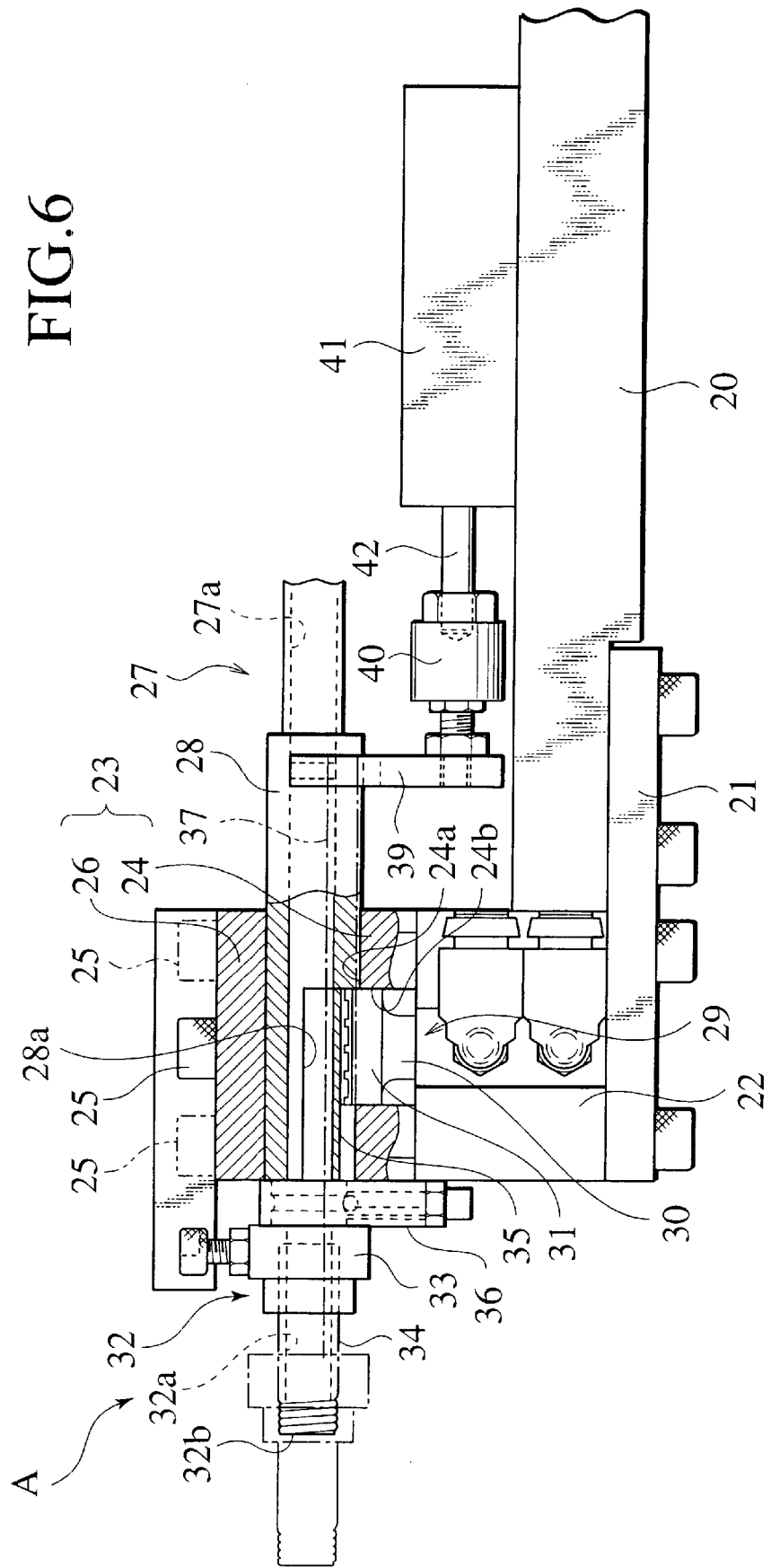
FIG. 6 is a partially cut-away side view of an essential portion of the electric wire supplying apparatus of the embodiment of the invention in which a nozzle of the apparatus is in its close position.
Figure 7:
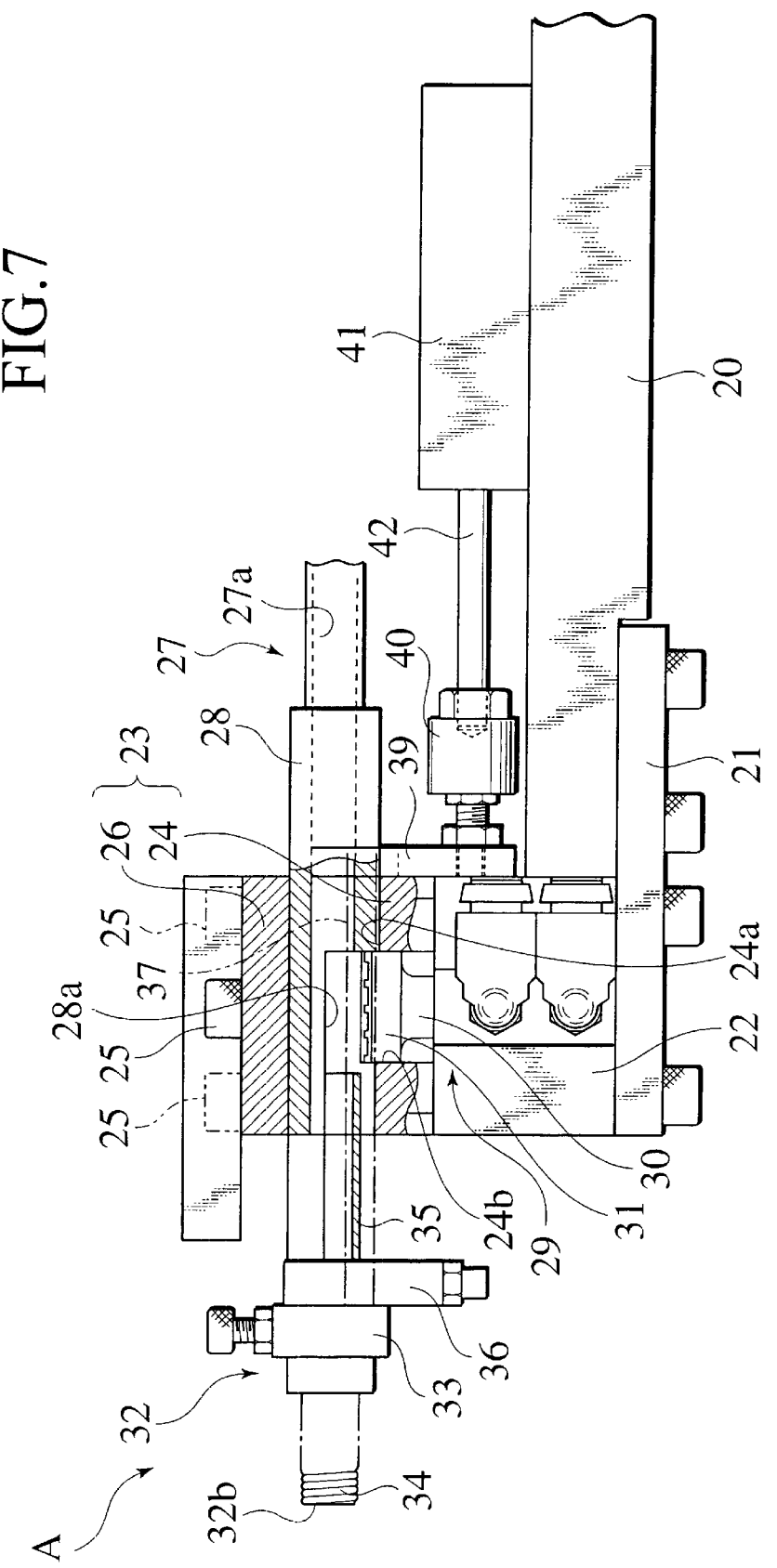
FIG. 7 is a partially cut-away side view of an essential portion of the electric wire supplying apparatus of the embodiment of the invention in which a nozzle of the apparatus is in its open position.

In FIGS. 3 to 7, an electric wire supplying apparatus A includes a turning arm 20 that is supported such that the turning arm 20 can rotate around its base end. The turning arm 20 is provided at its tip end with an air cylinder (driving cylinder) 22 through a connecting plate 21. A transfer tube fixing holder 23 is fixed to an upper surface of the air cylinder 22. The transfer tube fixing holder 23 comprises a holder body 24 having a recess 24a, and a lid 26 fixed to an upper portion of the holder body 24 through bolts 25 for covering an upper portion of the recess 24a.

A tip end 28 of an electric wire transfer tube 27 is disposed in the recess 24a of the holder body 24. The tip end 28 of the electric wire transfer tube 27 is pressed by the lid 26 and fixed. The electric wire transfer tube 27 is flexible except the tip end 28 so that the electric wire transfer tube 27 can follow the turning motion of the turning arm 20. The electric wire transfer tube 27 includes an electric wire insertion passage 27a therein, and an electric wire W inserted into the electric wire insertion passage 27a from the base end is guided in an electric wire sending-out direction (toward the tip end).

The tip end 28 of the electric wire transfer tube 27 is provided with a notch 28a opened downward, and the holder body 24 is provided at its portion corresponding to the notch 28a with an opening 24b. An electric wire pressing portion 31 fixed to a piston rod 30 of the air cylinder 22 is disposed in the opening 24b. The electric wire pressing portion 31 is air-driven by the air cylinder 22 and is moved into and out from the notch 28a. The electric wire pressing portion 31 can move between a pressing position where the electric wire pressing portion 31 presses the electric wire W and a standby position where the electric wire W of the electric wire insertion passage 27a is allowed to be sent out. That is, the air cylinder 22 and the electric wire pressing portion 31 constitute electric wire pressing means 29.

A nozzle 32 is disposed on the side of the tip end of the electric wire transfer tube 27, and includes a block base end 33 and a flexible tube 34 fixed to a tip end of the block base end 33, and an electric wire passage 32a is formed in the flexible tube 34. A tip end of the flexible tube 34 of the electric wire passage 32a is a tip end opening 32b, and the electric wire W is led outside from the tip end opening 32b. The nozzle 32 is provided at its portion closer to the electric wire transfer tube 27 with a projecting portion 35. The projecting portion 35 has a semi-cylindrical shape which completely complements and coincides with a shape of the notch 28a when the projecting portion 35 is butted to the tip end of the electric wire transfer tube 27. That is, the tip end 28 and the projecting portion 35 butted thereto form a pipe.

The projecting portion 35 and the block base end 33 are detachably fixed to a nozzle support holder 36. One end of a pair of left and right connection rods 37 and 37 are fixed to the nozzle support holder 36. This pair of connection rods 37 and 37 are inserted into a pair of guide holes 38 and 38 of the transfer tube fixing holder 23. The nozzle 32 is supported by the transfer tube fixing holder 23 through the nozzle support holder 36 and the connection rods 37 and 37. The pair of connection rods 37 and 37 are movably provided such that the rods can move in the respective guide holes 38 and 38 of the transfer tube fixing holder 23. If the connection rods 37 and 37 move, the nozzle 32 can move between a close position (position shown in FIG. 4) where the projecting portion 35 is brought into close contact with the notch 28a of the electric wire transfer tube 27 and butted to the notch 28a to close the opening 24b, and an open position (position shown in FIG. 5) where the projecting portion 35 is separated from the notch 28a of the electric wire transfer tube 27 to open the opening 24b.

The other ends of the pair of connection rods 37 and 37 project from the opposite sides of the 23, and the projected ends are fixed to a single vertical rod 39. The vertical rod 39 is connected, through a connection portion 40, to a piston rod 42 of a nozzle-moving air cylinder 41 that is nozzle driving means. That is, the nozzle 32 moves between the close position and the open position by a driving force of the nozzle-moving air cylinder 41.

Figure 8A:
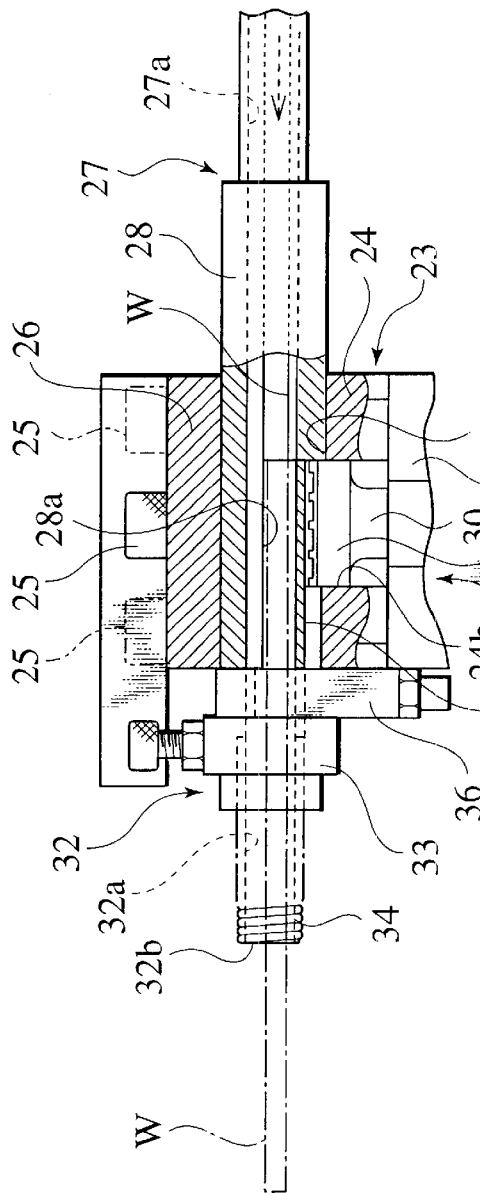

Next, the operation of the above structure will be explained. When a new electric wire W is allowed to pass to the nozzle 32 for changing quality, size or color of the electric wire W, as shown in FIG. 8A, the nozzle 32 is brought into the close position, and the electric wire W inserted into the electric wire transfer tube 27 is transferred into the electric wire sending-out direction. If the tip end of the electric wire W reached the notch 28a of the electric wire transfer tube 27, since the notch 28a butts to the projecting portion 35 of the nozzle 32 and the opening 24b of the transfer tube fixing holder 23 is closed, the electric wire W is guided to the electric wire passage 32a of the nozzle 32 even if a tip end of the electric wire W is bent or suspended downward. The transferred electric wire W is led out from the tip end opening 32b of the nozzle 32 through the electric wire passage 32a in the nozzle 32 as shown with a phantom line in FIG. 8A. Therefore, the new electric wire W can reliably be sent from the electric wire transfer tube 27 toward the nozzle 32.

Figure 8B:
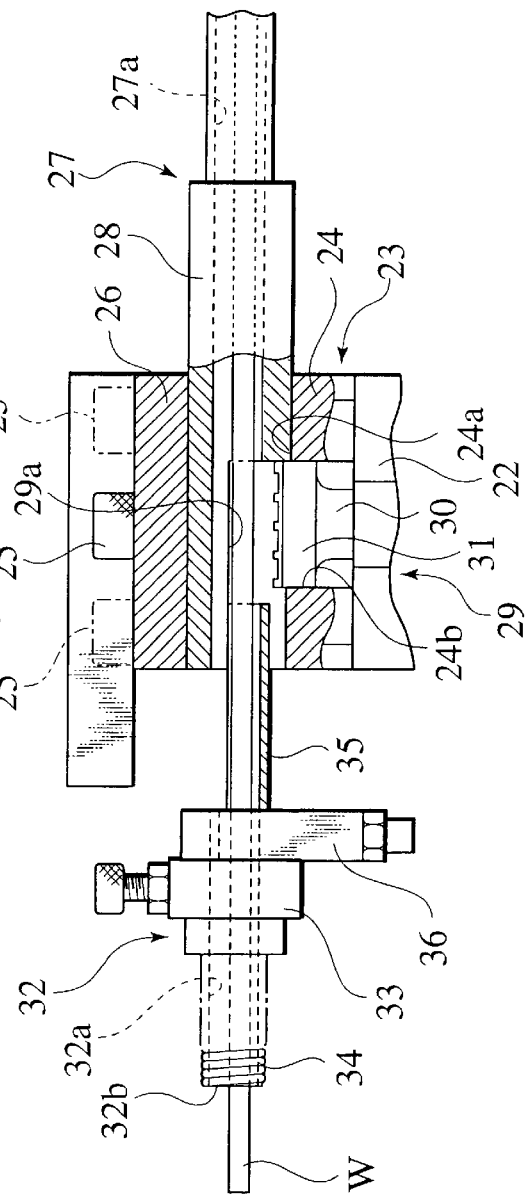

After the inserting operation of the new electric wire W is completed, as shown in FIG. 8B, the nozzle 32 is moved to the open position so that the electric wire pressing portion 31 can retreat into the notch 28a, and the electric wire pressing portion 31 can freely clamp the electric wire W and release the clamp. Working of the contact will be explained concretely. In each of predetermined rotation positions where the turning arm 20 is turned, various working machines are disposed in positions in the vicinity of and opposed to the nozzle 32, and a tip end of the electric wire W led out from the tip end of the nozzle 32 is worked by the various working machines. When the tip end is worked, the electric wire pressing portion 31 is moved to the pressing position to clamp the electric wire W, and if a predetermined working is completed, the tip end portion of the electric wire W is cut into a predetermined length. This cut tip end portion of the electric wire W is sent to a subsequent step, the electric wire pressing portion 31 is moved to the standby position to release the clamping state, the tip end portion of the electric wire W of the electric wire transfer tube 27 is sent out through a predetermined length, the electric wire W is let out through a predetermined length, and the above operations are repeated. That is, the electric wire supplying apparatus A supplies a tip end of the long electric wire W from the tip end of the nozzle 32 sequentially whenever a predetermined working of the tip end of the electric wire W is completed.

In this embodiment, since the nozzle 32 can be moved between the close position and the open position by the driving force of the nozzle-moving air cylinder 41, it is possible to automatically move the nozzle 32, and to automatically send the electric wire W.

In this embodiment, the nozzle 32 is supported by the connection rods 37 and 37 that are moved while being guided by the transfer tube fixing holder 23 and the nozzle support holder 36 fixed to the connection rods 37 and 37, and is also supported by the transfer tube fixing holder 23 through the connection rods 37 and 37 and the nozzle support holder 36 in such a manner that the nozzle 32 is movable. Therefore, it is possible to stably position the nozzle 32 with respect to the electric wire transfer tube 27 and to stably move the nozzle 32.

In this embodiment, when the projecting portion 35 has the shape which completely complements and coincides with the shape of the notch 28a when the projecting portion 35 is butted to the tip end of the electric wire transfer tube 27. Therefore, the tip end of the new electric wire W smoothly passes through the connected portion between the electric wire transfer tube 27 and the nozzle 32 and thus, it is possible to more reliably send the new electric wire from the electric wire transfer tube 27 toward the nozzle 32.

According to the embodiment, the projecting portion 35 has the shape which completely complements and coincides with the shape of the notch 28a of the electric wire transfer tube 27, but the projecting portion 35 may have a shape closing the opening 24b in the close position and having no recess that gets in the way of moving the electric wire W through the connected portion between the electric wire insertion passage 27a and the electric wire passage 32a, e.g., a shape substantially complementing the notch 28a of the electric wire transfer tube 27. Further, the nozzle 32 is supported by the transfer tube fixing holder 23 through the connection rods 37 and 37 and the nozzle support holder 36, but the nozzle 32 may be movable without being supported by the transfer tube fixing holder 23. Further, although the nozzle driving means comprises the nozzle-moving air cylinder 41, the nozzle driving means may be of another structure only if it generates a driving force for moving the connection rods 37 and 37 in the longitudinal direction.

What is claimed is:
1. An electric wire supplying apparatus comprising:
an electric wire transfer tube for guiding an electric wire inserted into an electric wire insertion passage in said electric wire transfer tube into an electric wire sending-out direction and provided at its tip end with a notch;

a nozzle disposed on a tip end of said electric wire transfer tube for guiding said electric wire sent out from said electric wire insertion passage out from a tip end opening through an electric wire passage in said nozzle;

a transfer tube fixing holder for fixing a tip end of said electric wire transfer tube and having an opening opened in said notch of said electric wire transfer tube; and electric wire pressing means having an electric wire pressing portion that can move from said opening into and out from said notch and moving said electric wire pressing portion between a pressing position for pressing said electric wire of said electric wire insertion passage and a standby position for sending said electric wire in said electric wire insertion passage;

wherein said nozzle is provided at its portion closer to said electric wire transfer tube with a projecting portion for substantially complementing a shape of the notch when said projecting portion is butted to a tip end of said electric wire transfer tube and said nozzle can move between a close position where said projecting portion is brought into close contact with the notch of said electric wire transfer tube and butted to said notch to close said opening, and an open position where said projecting portion is separated from said notch of said electric wire transfer tube to open said opening.

2. An electric wire supplying apparatus according to claim 1, wherein said nozzle is moved between said close position and said open position by a driving force of nozzle driving means.

3. An electric wire supplying apparatus according to claim 1, wherein said nozzle is supported by a connection rod that is moved while being guided by said transfer tube fixing holder and by a nozzle support holder fixed to the connection rod.

4. An electric wire supplying apparatus according to claim 1, wherein said projecting portion has a shape which completely complements and coincides with the shape of said notch when said projecting portion is butted to the tip end of said electric wire transfer tube.

* * * * *